(12) United States Patent
Beaulieu et al.

(10) Patent No.: US 7,515,275 B2
(45) Date of Patent: Apr. 7, 2009

(54) OPTICAL APPARATUS AND METHOD FOR DISTANCE MEASURING

(75) Inventors: René Beaulieu, L'Ancienne-Lorette (CA); Jean-François Cormier, St-Augustin (CA)

(73) Assignee: Institut National d'Optique, Sainte-Foy, Quebec (CA)

( * ) Notice: Subject to any disclaimer, the term of this patent is extended or adjusted under 35 U.S.C. 154(b) by 193 days.

(21) Appl. No.: 11/458,176

(22) Filed: Jul. 18, 2006

(65) Prior Publication Data

US 2008/0018907 A1 Jan. 24, 2008

(51) Int. Cl.
*G01B 9/02* (2006.01)
*G01J 3/45* (2006.01)

(52) U.S. Cl. .................. 356/482; 356/456; 356/479

(58) Field of Classification Search .............. 356/479, 356/482, 456
See application file for complete search history.

(56) References Cited

U.S. PATENT DOCUMENTS

| | | | |
|---|---|---|---|
| 4,838,679 A | 6/1989 | Bille | |
| 5,610,716 A * | 3/1997 | Sorin et al. | 356/479 |
| 6,419,484 B1 | 7/2002 | DaSilva et al. | |
| 6,760,112 B2 | 7/2004 | Reed et al. | |
| 7,126,693 B2 * | 10/2006 | Everett et al. | 356/479 |
| 7,349,098 B2 * | 3/2008 | Li | 356/479 |
| 7,355,721 B2 * | 4/2008 | Quadling et al. | 356/511 |
| 7,372,575 B2 * | 5/2008 | Fujita | 356/479 |
| 2005/0024646 A1 * | 2/2005 | Quadling et al. | 356/477 |
| 2006/0066869 A1 * | 3/2006 | Ueno et al. | 356/497 |
| 2008/0111996 A1 * | 5/2008 | Takeda et al. | 356/511 |

OTHER PUBLICATIONS

Hitzenberger, Christoph K., *Measurement of corneal thickness by low-coherence interferometry*, Applied Optics, vol. 31, No. 31, Nov. 1992.
Danielson, Bruce L.; Boisrobert, C.Y., *Absolute optical ranging using low coherence interferometry*, Applied Optics, vol. 30, No. 21, Jul. 1991.
Rao, Yun-Jiang; Jackson, David. A., *Recent progress in fibre optic low-coherence interferometry*, IOP Publishing Ltd., 1996.
Giniunas, Linas; Karkockas, Remigijus; Danielius, Romualdas, *Accurate remote distance sensing by use of low-coherence interferometry: an industrial application*, Applied Optics, vol. 37, No. 28, Oct. 1998.
Leitgeib, Rainer A., *Optical Coherence Tomography*, 2004.
Choma, Michael A.; Sarunic, Marinko V.; Yang, Changuei; Izatt, Joseph A., *Sensitivity advantage of swept source and Fourier domain optical coherence tomography*, Optics Express, vol. 11, No. 18, Sep. 2003.

* cited by examiner

*Primary Examiner*—Patrick J Connolly
(74) *Attorney, Agent, or Firm*—Ogilvy, Renault, LLP; Isabelle Chabot

(57) ABSTRACT

An optical sensor for determining a distance between a target and a probe head is described. The optical sensor comprises a light source delivering a broadband spectrum; a fiber-optic Michelson interferometer (FOMI) for creating an interferogram; and an analyzer unit for receiving the interferogram from an output of the FOMI and for determining the distance of the target by finding a position corresponding to a maximum in a Fourier transform of the spectral distribution of the interferogram. The FOMI comprises a probing optical fiber terminated by the probe head and a reference optical fiber, the reference optical fiber having a fixed optical path length.

13 Claims, 2 Drawing Sheets

OPTICAL APPARATUS AND METHOD FOR DISTANCE MEASURING

FIELD OF THE INVENTION

The invention relates to optical sensors for determining the distance of target. In particular, the invention relates to optical fiber sensors based on low-coherence interferometry for determining the distance between a target and a probe head.

BACKGROUND OF THE ART

Several techniques exist to optically measure the distance of a target relative to a reference point. One of these techniques is laser triangulation. When sufficiently high numerical apertures can be used, laser triangulation techniques offer resolution at the micrometer scale. However, in the case where it is not possible to use large numerical apertures, laser triangulation techniques are less precise.

Time-of-flight techniques can also be used to determine the distance to a target. However, these techniques are based on using pulsed light sources and are generally used to measure long distances (in the kilometer range) with typical resolution at the meter range. Resolution of time-of-flight techniques can be improved when shorter light pulses and faster detection schemes are used, but a costly and complex measurement system is then required.

The Fourier transform analog to the time-of-flight technique is called Phase modulation telemetry. It proceeds by measuring the relative phase of the light modulated at frequency f, and coming back from a reflection on the target object. The phase difference can be related to the distance of the object. This technique has allowed demonstration of resolution in the range of 1 mm, but with an larger absolute distance value of the order of 5 mm due to the severe requirements on the phase value measurement at high modulation frequency.

Another way to measure a distance to a target is to use an interferometer with coherent light. Typical interferometers offer very good resolution (at the sub-wavelength range). However, the distance range that they measure is limited due to the phase ambiguity problem. The phase ambiguity can be removed by the use of dual wavelength sources as suggested by many authors. However, the requirement on the wavelength stability and the phase locking of both sources make the systems costly and unreliable.

One way to measure distances in the range of 0 to 20 mm is to use an optical sensor based on low-coherence interferometry. Low-coherence interferometers use a light source having a broadband intensity spectrum (in comparison to highly coherent sources such as lasers which have very narrow intensity spectrum) to determine the position of a target. In one of such existing systems, the spectrum intensity is coupled to a scanning Michelson interferometer. The scanning Michelson interferometer has a reference arm and a measuring arm, the measuring arm being the arm used for measuring the distance to the target. In such existing systems, the length of the reference arm needs to be scanned by a mechanical means during the measuring process.

There is a need for an optical sensor for distance measuring of a target that could be used in narrow conduits, that could measure distances in the range of a few micrometers to a few millimeters with good resolution, and that does not require moving mechanical parts.

SUMMARY

Therefore, it is an aim of the present invention to provide an optical sensor for distance measuring of a target which addresses issues associated with the prior art.

The invention provides an optical sensor for distance measuring of a target that can be used in narrow conduits, that can measure distances in the range of a few micrometers to a few millimeters with good resolution, and that does not require moving mechanical parts.

Therefore, in accordance with the present invention, there is provided an optical sensor for determining a distance between a target and a probe head. The optical sensor comprises a light source delivering a broadband spectrum; a fiber-optic Michelson interferometer (FOMI) for creating an interferogram; and an analyzer unit for receiving the interferogram from an output of the FOMI and for determining the distance of the target by finding a position corresponding to a maximum in a Fourier transform of the interferogram. The FOMI comprises a probing optical fiber terminated by the probe head and a reference optical fiber, the reference optical fiber having an optical path length of fixed length.

The invention also provides an optical sensor for determining a distance between a target and a probe head. The optical sensor comprises: a light source delivering a broadband spectrum; a fiber-optic Michelson interferometer (FOMI) for creating an interferogram; and an analyzer unit for receiving the interferogram from an output of the FOMI and for determining the distance of the target by finding a position corresponding to a maximum in a Fourier transform of the interferogram, the FOMI comprising: a probing optical fiber coupled at one end to the light source and having at the other end the probe head, the probing optical fiber for propagating a first amplitude portion of the broadband spectrum from the coupled end towards the probe head and for illuminating the target with the first amplitude portion of the broadband spectrum exiting the probe head and for propagating back toward the output of the FOMI a reflected spectrum from the target, whereby a measuring signal is provided at the output; and a reference optical fiber coupled at one end to the light source, the reference optical fiber for propagating a second portion of amplitude of the broadband source along a reference optical path of fixed length, whereby a reference signal is provided at the output, the addition of the measuring and reference signals forming the interferogram.

The invention also provides the reference optical fiber with a retro-reflector. The invention also provides the probe head with a GRadient INdex (GRIN) lens. The invention also provides the analyzer unit with a spectrometer for dispersing the interferogram as a function of wavelength along a detection axis of a linear detector array and for detecting an intensity of the dispersed interferogram as a function of a position along the detection axis.

The invention also provides an optical probe for use in distance measuring of a target. The optical probe comprises: a light source delivering a broadband spectrum; and a fiber-optic Michelson interferometer (FOMI) for creating an interferogram at an output of the FOMI, the FOMI comprising: a probing optical fiber coupled at one end to the light source and having at the other end a probe head, the probing fiber for propagating a first amplitude portion of the broadband spectrum from the coupled end towards the probe head and for illuminating the target with the first amplitude portion of the broadband spectrum exiting the probe head and for propagating back toward the output of the FOMI a reflected spectrum from the target, whereby a measuring signal is provided at the output; and a reference optical fiber coupled at one end to the light source, the reference optical fiber for propagating a second portion of amplitude of the broadband source along a reference optical path of fixed length, whereby a reference signal is provided at the output, the addition of the measuring and reference signals forming the interferogram.

The invention also provides the reference optical fiber with a retro-reflector. The invention also provides the probe head with a GRIN lens.

The invention also provides a method for determining a distance separating a target from a probe head of a probing optical fiber. The method comprises: creating an interferogram by combining a measuring signal with a reference signal; measuring the intensity of the interferogram as a function of wavelength; and determining the distance of the target by finding a position corresponding to a maximum in a Fourier transform of the detected intensity, the measuring signal being obtained by propagating a first amplitude portion of a broadband spectrum into the probing optical fiber towards the probe head, illuminating the target with the first amplitude portion of the broadband spectrum exiting the probe head and propagating back, into the probing optical fiber and towards an output, a reflected spectrum from the target whereby the measuring signal is provided at the output; the reference signal being obtained by propagating a second amplitude portion of the broadband spectrum along a reference optical path of fixed length, whereby the reference signal is provided at the output.

The invention also provides, at the step of measuring, dispersing the interferogram as a function of wavelength along a detection axis and detecting the intensity as a function of a position along the detection axis. The invention also provides determining the distance separating an object to the probe head.

According to one aspect, there is provided an optical sensor for determining a distance between a target and a probe head. The sensor comprises: a low-coherence light source delivering a broadband spectrum; a fiber-optic Michelson interferometer (FOMI) for creating an interferogram; and an analyzer unit for determining the distance to the target and comprising a Fourier transform unit for calculating a Fourier transform of the spectral distribution of the interferogram, the distance being determined by finding a value of the distance corresponding to a maximum in the Fourier transform. The FOMI comprises : a probing optical fiber having at a first end the probe head and coupled at a second end to the light source such that a first amplitude portion of the broadband spectrum is to propagate from the second end towards the probe head and such that a measuring signal resulting from a reflection of the first amplitude portion on the target is to propagate back in the probing optical fiber from the first end toward an output of the FOMI, the probe head being an integral element having a first end surface and a second end surface, the first end surface being in contact with the first end of the probing optical fiber to receive the first amplitude portion, and the first amplitude portion exiting the probe head from the second end surface to directly illuminate the target; and a reference optical fiber coupled at one end to the light source such that a second portion of amplitude of the broadband source is to propagate along a reference optical path of fixed length to provide a reference signal at the output, the probing optical fiber and the reference optical fiber being coupled such that the measuring signal and the reference signal are to be combined to form the interferogram.

According to another aspect, there is provided an optical probe for use in distance measuring of a target. The probe comprises: a low-coherence light source delivering a broadband spectrum; and a fiber-optic Michelson interferometer (FOMI) for creating an interferogram at an output of the FOMI. The FOMI comprises: a probing optical fiber having at a first end a probe head and coupled at a second end to the light source such that a first amplitude portion of the broadband spectrum is to propagate from the second end towards the probe head and such that a measuring signal resulting from a reflection of the first amplitude portion on the target is to propagate back in the probing optical fiber from the first end toward the output of the FOMI, the probe head being an integral element having a first end surface and a second end surface, the first end surface being in contact with the first end of the probing optical fiber to receive the first amplitude portion, and the first amplitude portion exiting the probe head from the second end surface to directly illuminate the target; and a reference optical fiber coupled at one end to the light source such that a second portion of amplitude of the broadband source is to propagate along a reference optical path of fixed length to provide a reference signal at the output, the probing optical fiber and the reference optical fiber being coupled such that the measuring signal and the reference signal are to be combined to form the interferogram.

According to still another aspect, there is provided a method for determining a distance separating a target from a probe head of a probing optical fiber. The method comprises: propagating a first amplitude portion of a low-coherence broadband spectrum into the probing optical fiber towards the probe head; propagating the first amplitude portion from the probing optical fiber to a first end surface of the probe head in contact with the probing optical fiber and to a second end surface of the probe head; directly illuminating the target with the first amplitude portion exiting the probe head from the second end surface; propagating back, into the probing optical fiber, a measuring signal resulting from a reflection of the first amplitude portion on the target; propagating a second amplitude portion of the broadband spectrum along a reference optical path of fixed length to obtain a reference signal; creating an interferogram by combining the measuring signal with the reference signal; measuring an intensity of the interferogram as a function of wavelength; and determining the distance of the target by finding a value of the distance corresponding to a maximum in a Fourier transform of the spectral distribution of the detected intensity.

DESCRIPTION OF THE DRAWINGS

In order for the invention to be readily understood, embodiments of the invention are illustrated by way of example in the accompanying drawings.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
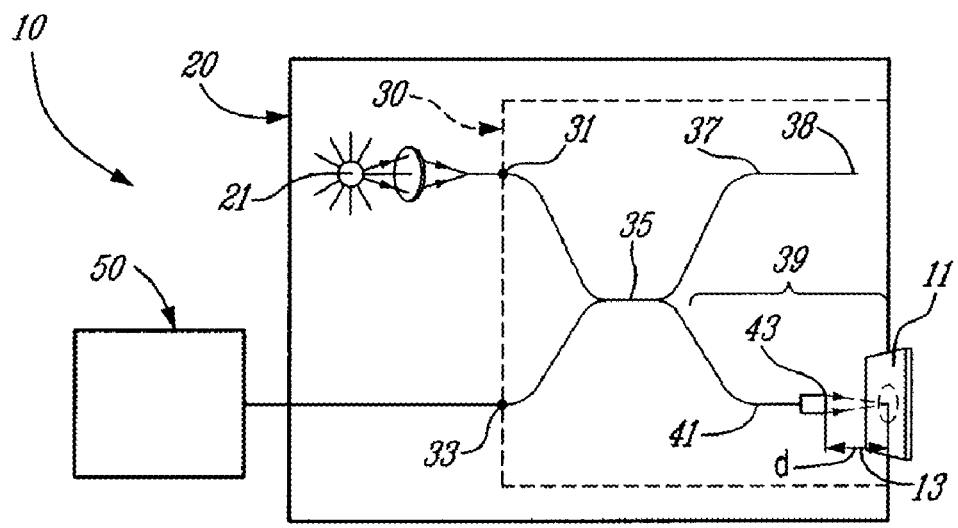
FIG. 1 is a schematic view of an optical sensor for distance measuring of a target, in accordance with an embodiment of the present invention.

FIG. 1 is a schematic view of the present invention which provides an optical sensor 10 that can be used to determine the distance 13 of a target 11 relative to a probe head 43 of the sensor 10. The sensor 10 comprises a broadband light source 21 coupled to the input 31 of a fiber-optic Michelson interferometer 30, and an analyzer unit 50 coupled to the output 33 of the interferometer 30. In accordance with an embodiment of the present invention, the interferometer 30 comprises a bi-directional coupler 35, the coupler 35 coupling the light source 21, the reference arm 37, the measuring arm 39 and the output 33 of the interferometer. The reference arm 37 is an optical fiber terminated by a retro-reflector 38, so as to provide a reference optical path length having a fixed length. The measuring arm 39 is formed by an optical fiber, referred to as the probing optical fiber 41, and by the target 11 located at a distance d 13 from the probe head 43 of the probing fiber 41. Thus, the optical path length of the measuring arm 39 varies with the distance 13 to the target. In one embodiment, the probe head 43 comprises a GRIN lens.

The optical probe 20, which comprises the source 21 coupled to the Michelson interferometer 30, is used to create an interferogram containing information about the distance 13 to the target 11. Once the interferogram is formed, the analysis unit 50 interprets the interferogram in order to determine the distance 13 to the target 11.

The present invention takes advantage of low-coherence interferometry for measuring the distance 13 to the target 11. Light source 21 is a broadband source such as, for example, a light emitting diode (LED). In an embodiment of the present invention, light source 21 is emitting a broadband spectrum having a width of about 20 nm and being centered around 820 nm, providing the possibility of measuring a range of distances of more than 10 mm with a precision of tens of microns. Obviously, other types of sources can be used. Furthermore, the light source and detector parameters may be different from those described above so as to provide other ranges of distance measuring and precision.

Light source 21 emits a wave, which travels towards the coupler 35. The coupler 35 divides the wave in two, one segment is directed into the reference arm 37 and is propagated back along the reference arm 37 and towards the coupler 35 after having been reflected by the retro-reflector 38. Another segment is directed into the probing optical fiber 41, propagates towards the probe head 43, and exits the probe head 43 so as to illuminate the target 11. Target 11 reflects back some of the light and some of this reflected spectrum is collected by the probe head 43 and travels back through the probing optical fiber 41 towards the coupler 35. Coupler 35 combines those reflected signals (one from the reference arm 37 and one from the measuring arm 39) and directs them toward the interferometer output 33. Coupler 35 is, for example, a 50/50 fused-fiber coupler. At the output 33 of the interferometer 30, an interferogram is thus created in the spectral domain. This interferogram is then directed to the analyzer unit 50 which determines the distance 13.

Figure 2:
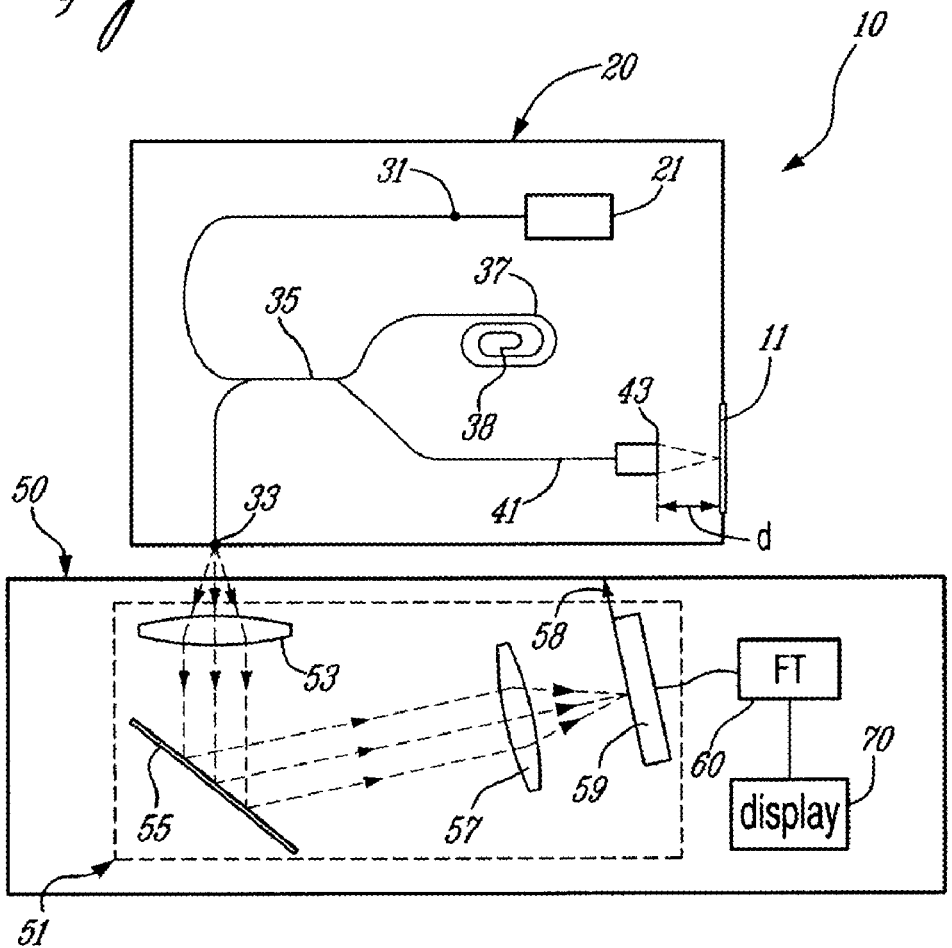
FIG. 2 is a schematic view of a particular embodiment of the optical sensor of FIG. 1.

FIG. 2 illustrates, in more detail, the components of an embodiment of the analyzer unit 50. The unit 50 comprises a spectrometer 51, a Fourier transform unit 60 and a display 70. The spectrometer 51 serves to disperse the incoming interferogram as a function of the wavelength along a detection axis 58 of a linear detector array 59 and to detect the interferograin via the linear detector array 59. One possible way to realize the above is to use a grating 55 in combination with lens 53 and 57 in a configuration such as illustrated in FIG. 2.

Obviously, other ways that are known to the person skilled in the art exist to disperse the interferogram such as, for example, prisms, could be used as well. Once dispersed on the linear detector array 59, the intensity of the interferogram as a function of wavelength can be obtained. The intensity of the interferogram as a function of wavelength may be expressed as:

$$dI = f(\lambda)[1 + v * \cos(\omega \tau)]d\lambda, \quad (1)$$

with $$\omega = 2\pi \frac{c}{\lambda} \text{ and } \tau = 2\frac{L}{c},$$

where $\lambda$, $2*L$, c, v and $f(\lambda)$ are respectively the wavelength, the difference between the optical length of the reference arm and the optical path length of the measuring arm, the speed of light, the contrast of the fringes of the interferogram, and the intensity spectrum of the light source 21. By assuming that the light source emits a uniform intensity as a function of wavelength, this intensity will produce upon detection by the linear detection array 59 an electrical signal $V(\lambda)$:

$$V(\lambda) = V_0\left[1 + v * \cos\left(\frac{4\pi L}{\lambda}\right)\right] \quad (2)$$

where $V_o$ is a constant.

By assuming a linear variation of the wavelength along the detection axis 58 of the linear detector array 59: $\lambda = \lambda_1 + ax$, (2) may be written as follows:

$$V(x) = V_0\left[1 + v * \cos\left(\frac{4\pi L}{\lambda_1 + ax}\right)\right] \quad (3)$$

where $\lambda_1$ is the shortest wavelength of the detected signal and a is a proportionality constant. The bandwidth $\Delta\lambda$ of the intensity spectrum of the light source being quite smaller than $\lambda_1$ (typically tens of nm), we can use the following approximation:

$$\frac{1}{\lambda_1 + ax} \approx \frac{1}{\lambda_1}\left(1 - \frac{ax}{\lambda_1}\right)$$

and equation (3) becomes:

$$V(x) = V_0\left\{1 + v * \cos\left[\frac{4\pi L}{\lambda_1}\left(1 - \frac{ax}{\lambda_1}\right)\right]\right\} \quad (4)$$

Expressed in terms of the pixels of the linear detector array 59, normalized $V(x)$ becomes:

$$V_q = 1 + v * \cos\left[\frac{4\pi L}{\lambda_1}\left(1 - \frac{aq}{\lambda_1}\right)\right] \quad (5)$$

where q=0, 1, 2, . . . , 2047 for a linear detector array having 2048 pixels.

In one embodiment of the present invention, linear detection array 59 has 2048 pixels and the detected intensity of the interferogram is thus a vector of 2048 $V_q$ values, each $V_q$ value corresponding to a wavelength.

Figure 3:
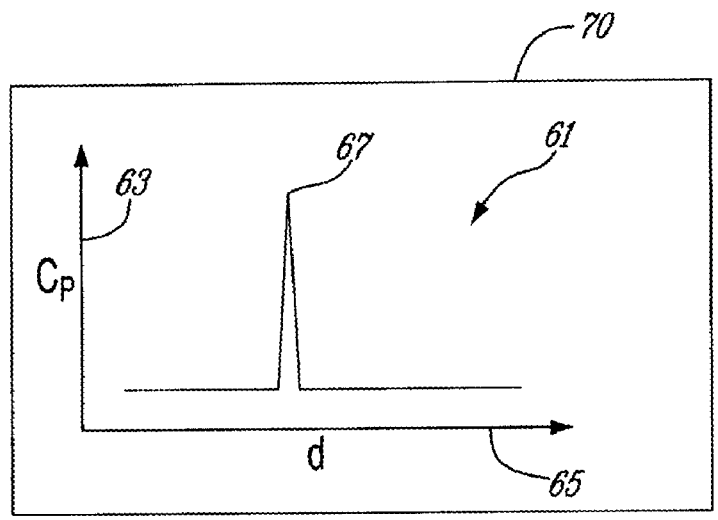
FIG. 3 is a graphic representation of the Fourier transform of the output signal of the optical sensor of FIG. 2, as a function of the target distance.

To determine the difference between the optical path length of the reference arm and the optical path length of the measuring arm (2L), a discrete Fourier transform of the vector of 2048 $V_q$ values is performed:

$$C_p = \frac{1}{\sqrt{n}} \sum_q V_q e^{j2\pi \frac{p}{n} q} \qquad (6)$$

where p=0, 1, 2 . . . , 1023 et n=2048. Graph 61, illustrated in FIG. 3, displays the imaginary portion of the Fourier transform of the detected dispersed intensity as a function of the target distance. The x-axis 65 corresponds to the target distance, whereas the y-axis 63 corresponds to the coefficients $C_p$ of the imaginary portion of the Fourier transform. The maximum 67 of the graph 61 is located at a position corresponding to the distance d 13 of the target 11.

Figure 4:
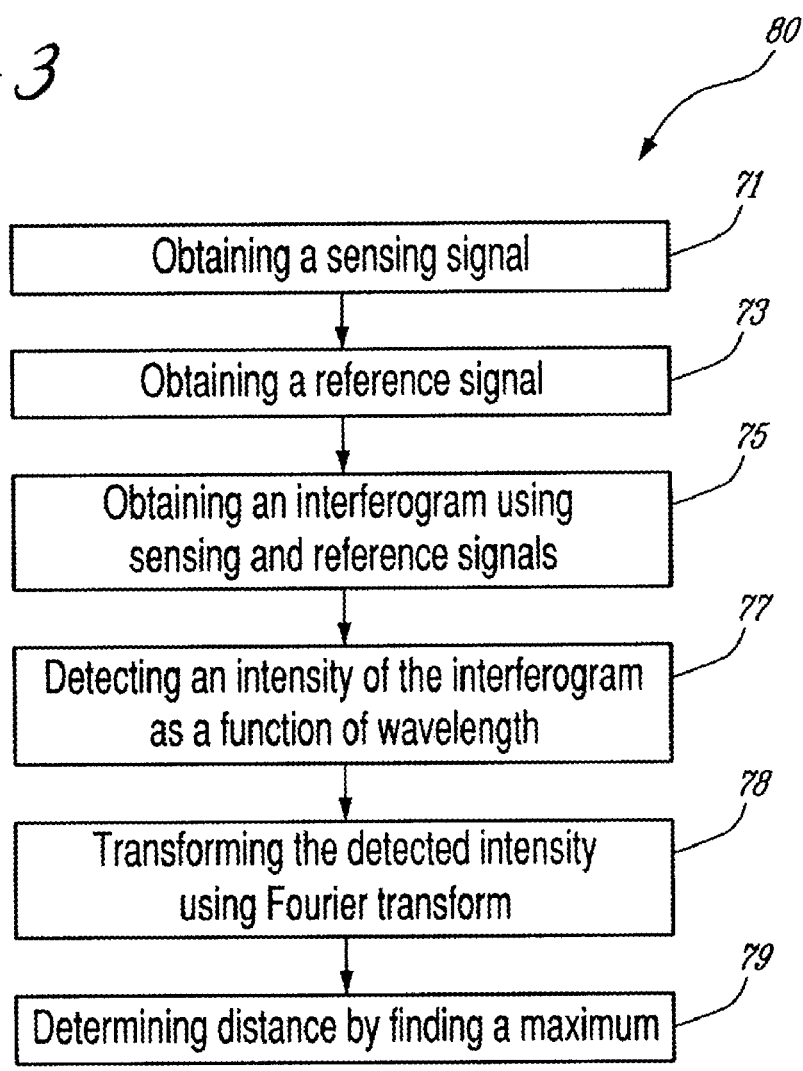
FIG. 4 is a flow chart for a method of distance measuring, in accordance with another embodiment of the present invention.

Turning now to FIG. 4, a method 80 for determining a distance of a target relative to the probe head 43 of the optical sensor 10 will be described. The method 80 comprises obtaining a measuring signal (step 71) and obtaining a reference signal (step 73). Step 71 is provided by propagating a first amplitude portion of a broadband spectrum into a probing optical fiber 41 towards the probe head 43, illuminating the target 11 with the first amplitude portion of the broadband spectrum exiting the probe head 43 and propagating back into the probing optical fiber 41 and towards an output 33, a reflected spectrum from the target 11, whereby a measuring signal is provided at the output 33.

Step 73 is provided by propagating a second amplitude portion of the broadband spectrum into a reference optical fiber 37 having a predetermined length and propagating back the second amplitude portion into the reference fiber 37 towards the output, after reflection at one end 38 of the reference fiber 37, whereby the reference signal is provided at the output. Step 75 of obtaining an interferogram using the measuring and reference signals is provided by combining the measuring and reference signals at the coupler whereby an interferogram is created.

The interferogram is then dispersed along a detection axis as a function of the wavelength and detected as a function of the wavelength (step 77). The detected intensity is Fourier transformed at step 78. At step 79, the distance 13 of the target 11 is determined by finding a position corresponding to a maximum of the Fourier Transform.

Optical sensor 10 can be realized with different types of light source 21 and different types of spectrometer 51. For example, in one embodiment, light source 21 is a superluminescent diode from Superlum Diodes LTD, emitting 10 mW at 820 nm and having a bandwidth of 20 nm; the linear detector array 59 is a CCD of 2048 pixels from ALPHAS that has a spectral range between 320 and 1100 nm; and the spectrometer 51 comprises a diffraction grating 55 from Edmund that has 1200 l/mm.

In an alternative embodiment, light source 21 is a superluminescent diodes from DenseLight, emitting 10 mW at 1310 nm and having a bandwidth of 30 nm; the linear detector array 59 is a CCD of 512 pixels from Sensor Unlimited that has a spectral range between 900 and 1700 nm; and the diffraction grating 55 is chosen appropriately so has to dispersed the light source spectrum on the CCD array.

In a yet alternative embodiment, light source 21 is a ELED (edge-emitting) diodes from PL-LD, directly coupled to a single mode fiber, emitting 5 µW at 1310 nm; the linear detector array 59 is an array of Silicon photodetectors comprising 2048 pixels from Perkin Elmers; and the diffraction grating 51 is chosen appropriately so has to dispersed the light source spectrum on the CCD array.

As will be obvious for someone skilled in the art, the parameters of sensor 10 may be adjusted so as to provide a desired distance measurement range with a desired resolution. For example, it is possible to select a light source 21 having a desired spectrum width and adjust the resolution of the dispersive device 51 in order to provide a distance measuring having determined measurement range and resolution.

Although the present invention has been described hereinabove by way of specific embodiments thereof, it can be modified, without departing from the spirit and nature of the subject invention as defined herein. The scope of the invention is therefore intended to be limited solely by the scope of the appended claims.

I/we claim:

1. An optical sensor for determining a distance between a target and a probe head, the sensor comprising:
    a low-coherence light source delivering a broadband spectrum;
    a fiber-optic Michelson interferometer (FOMI) for creating an interterogram; and
    an analyzer unit for determining the distance to the target and comprising a Fourier transform unit for calculating a Fourier transform of the spectral distribution of the interferogram, the distance being determined by finding a value of the distance corresponding to a maximum in the Fourier transform;
    the FOMI comprising:
        a probing optical fiber having at a first end the probe head and coupled at a second end to the light source such that a first amplitude portion of the broadband spectrum is to propagate from the second end towards the probe head and such that a measuring signal resulting from a reflection of the first amplitude portion on the target is to propagate back in the probing optical fiber from the first end toward an output of the FOMI, the probe head being an integral element having a first end surface and a second end surface, the first end surface being in contact with the first end of the probing optical fiber to receive the first amplitude portion, and the first amplitude portion exiting the probe head from the second end surface to directly illuminate the target; and
        a reference optical fiber coupled at one end to the light source such that a second portion of amplitude of the broadband source is to propagate along a reference optical path of fixed length to provide a reference signal at the output,
        the probing optical fiber and the reference optical fiber being coupled such that the measuring signal and the reference signals are to be combined to form the interferogram.

2. The optical sensor of claim 1, wherein the reference optical fiber comprises a retro-reflector at an end of said reference optical fiber.

3. The optical sensor of claim 1, wherein the probe head comprises a gradient index component.

4. The optical sensor of claim 1, wherein the light source comprises a Light Emitting Diode (LED).

5. The optical sensor of claim 1, wherein the analyzer unit comprises a spectrometer for dispersing the interferogram as a function of wavelength along a detection axis of a linear detector array and for detecting an intensity of the dispersed interferogram as a function of a position along the detection axis.

6. The optical sensor of claim 5, wherein the linear detector array comprises a Charge-Coupled Device (CCD) linear array.

7. An optical probe for use in distance measuring of a target, the probe comprising:
   a low-coherence light source delivering a broadband spectrum; and
   a fiber-optic Michelson interferometer (FOMI) for creating an interferogram at an output of the FOMI, the FOMI comprising:
      a probing optical fiber having at a first end a probe head and coupled at a second end to the light source such that a first amplitude portion of the broadband spectrum is to propagate from the second end towards the probe head and such that a measuring signal resulting from a reflection of the first amplitude portion on the target is to propagate back in the probing optical fiber from the first end toward the output of the FOMI, the probe head being an integral element having a first end surface and a second end surface, the first end surface being in contact with the first end of the probing optical fiber to receive the first amplitude portion, and the first amplitude portion exiting the probe head from the second end surface to directly illuminate the target; and
      a reference optical fiber coupled at one end to the light source such that a second portion of amplitude of the broadband source is to propagate along a reference optical path of fixed length to provide a reference signal at the output,
      the probing optical fiber and the reference optical fiber being coupled such that the measuring signal and the reference signal are to be combined to form the interferogram.

8. The optical probe of claim 7, wherein the reference optical fiber comprises a retro-reflector.

9. The optical probe of claim 7, wherein the probe head comprises a gradient index component.

10. The optical probe of claim 7, wherein the light source comprises a Light Emitting Diode (LED).

11. A method for determining a distance separating a target from a probe head of a probing optical fiber, the method comprising:
   propagating a first amplitude portion of a low-coherence broadband spectrum into the probing optical fiber towards the probe head;
   propagating the first amplitude portion from the probing optical fiber to a first end surface of the probe head in contact with the probing optical fiber and to a second end surface of the probe head;
   directly illuminating the target with the first amplitude portion exiting the probe head from the second end surface;
   propagating back into the probing optical fiber, a measuring signal resulting from a reflection of the first amplitude portion on the target;
   propagating a second amplitude portion of the broadband spectrum along a reference optical path of fixed length to obtain a reference signal;
   creating an interferogram by combining the measuring signal with a the reference signal;
   measuring an intensity of the interferogram as a function of wavelength; and
   determining the distance of the target by finding a value of the distance corresponding to a maximum in a Fourier transform of the spectral distribution of the detected intensity.

12. The method as claimed in claim 11, wherein the step of measuring comprises dispersing the interferogram as a function of wavelength along a detection axis and detecting the intensity as a function of a position along the detection axis.

13. The method as claimed in claim 11, wherein the step of measuring comprises dispersing the interferogram as a function of wavelength along a detection axis of linear detection array and detecting the intensity with the linear detection array.

* * * * *